US012621648B2

(12) United States Patent
Lor et al.

(10) Patent No.: US 12,621,648 B2
(45) Date of Patent: May 5, 2026

(54) METHODS AND SYSTEMS FOR DISTRIBUTED MOBILE SUBSCRIPTION MANAGEMENT VIA eSIM

(71) Applicant: T-Mobile USA, Inc., Bellevue, WA (US)

(72) Inventors: Boua Thong Lor, Renton, WA (US); Adam Scott Dallas, Bellevue, WA (US); Julian Jesse Jacobson, Seattle, WA (US); Srinivas Meka, Bothell, WA (US); Hamza Hydri Syed, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 315 days.

(21) Appl. No.: 18/448,015

(22) Filed: Aug. 10, 2023

(65) Prior Publication Data

US 2025/0056203 A1 Feb. 13, 2025

(51) Int. Cl.
*H04W 8/18* (2009.01)
*H04W 4/50* (2018.01)
*H04W 4/60* (2018.01)

(52) U.S. Cl.
CPC ............... *H04W 8/18* (2013.01); *H04W 4/50* (2018.02); *H04W 4/60* (2018.02)

(58) Field of Classification Search
CPC ........... H04W 8/18; H04W 4/50; H04W 4/60; H04W 8/183
See application file for complete search history.

(56) References Cited

U.S. PATENT DOCUMENTS

| | | | |
|---|---|---|---|
| 10,334,432 B2 | 6/2019 | Lee et al. | |
| 11,129,026 B1 * | 9/2021 | Chauhan | ............... H04W 4/50 |
| 11,223,941 B2 | 1/2022 | Namiranian | |
| 2020/0045519 A1 * | 2/2020 | Raleigh | ................... H04W 4/08 |

* cited by examiner

*Primary Examiner* — Joseph E Dean, Jr.
(74) *Attorney, Agent, or Firm* — Lee & Hayes, P.C.

(57) ABSTRACT

Methods and systems for distributed mobile subscription management are described herein. According to an implementation, a computer server on a third-party computer platform may obtain information related to services provided by a telecommunication carrier. The computer server may generate advertisements of the services and present the advertisements on a graphical user interface (GUI) of an app installed on a user device, the app being associated with the third-party computer platform. The computer server may further receive a user interaction to select the service on the GUI of the app. In response to the selection, the computer server may provide one or more user interfaces on the GUI of the app, enabling an instant subscription of the service for the user using eSIM based at least in part on user profile associated with the app.

20 Claims, 8 Drawing Sheets

500

500

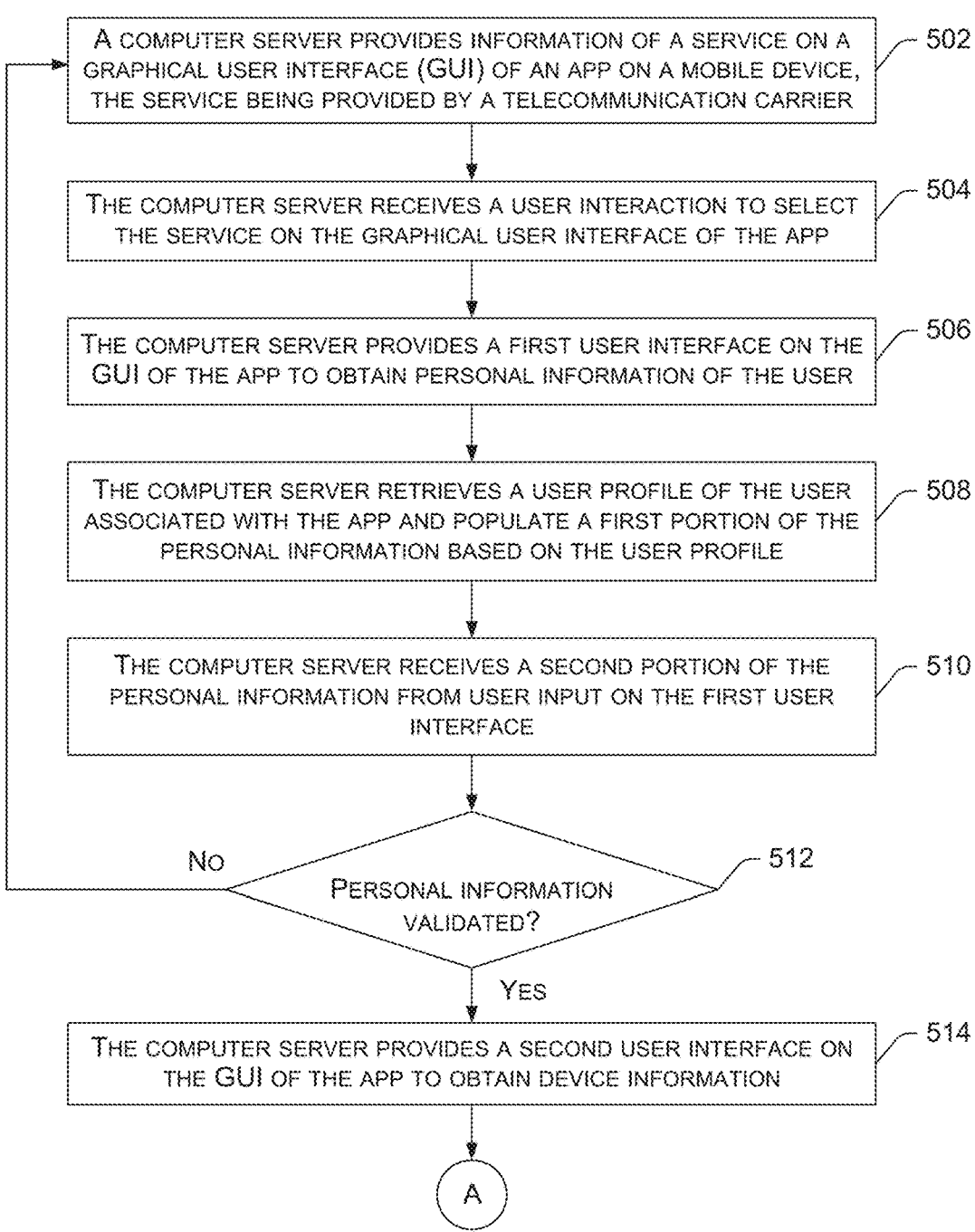

A COMPUTER SERVER PROVIDES INFORMATION OF A SERVICE ON A GRAPHICAL USER INTERFACE (GUI) OF AN APP ON A MOBILE DEVICE, THE SERVICE BEING PROVIDED BY A TELECOMMUNICATION CARRIER — 502

THE COMPUTER SERVER RECEIVES A USER INTERACTION TO SELECT THE SERVICE ON THE GRAPHICAL USER INTERFACE OF THE APP — 504

THE COMPUTER SERVER PROVIDES A FIRST USER INTERFACE ON THE GUI OF THE APP TO OBTAIN PERSONAL INFORMATION OF THE USER — 506

THE COMPUTER SERVER RETRIEVES A USER PROFILE OF THE USER ASSOCIATED WITH THE APP AND POPULATE A FIRST PORTION OF THE PERSONAL INFORMATION BASED ON THE USER PROFILE — 508

THE COMPUTER SERVER RECEIVES A SECOND PORTION OF THE PERSONAL INFORMATION FROM USER INPUT ON THE FIRST USER INTERFACE — 510

No     PERSONAL INFORMATION VALIDATED? — 512

Yes

THE COMPUTER SERVER PROVIDES A SECOND USER INTERFACE ON THE GUI OF THE APP TO OBTAIN DEVICE INFORMATION — 514

METHODS AND SYSTEMS FOR DISTRIBUTED MOBILE SUBSCRIPTION MANAGEMENT VIA eSIM

BACKGROUND

Driving engagement and traffic to the services provided by a telecommunication carrier using conventional ways is costly. Subscription to the services can be done by ordering the services online, via a phone call, or by visiting a local store. The subscription is not activated until a physical SIM card is inserted into a mobile device and an activation is completed. There would be a few days delay if the physical SIM card is sent in mail. A digital SIM card is an emerging technique that allows the subscription to be activated more efficiently.

The digital SIM card, also known as eSIM, is a software or a mobile app that allows a customer to activate the mobile service subscription with no need to use a physical SIM card. The customer may install eight or more eSIMs on an iPhone and use two phone numbers at the same time. Nowadays, eSIM is mostly offered through the website and the app of the telecommunication carrier. People sometimes is not aware of the eSIM product until he/she renews the service or switches to another carrier. There is a need to partner the mobile service subscription with a third-party platform to drive more engagement and traffic to the telecommunication carrier's network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 5A-5B illustrate an example flowchart for distributed mobile subscription management, according to an example of the present disclosure.

DETAILED DESCRIPTION

Figure 1:
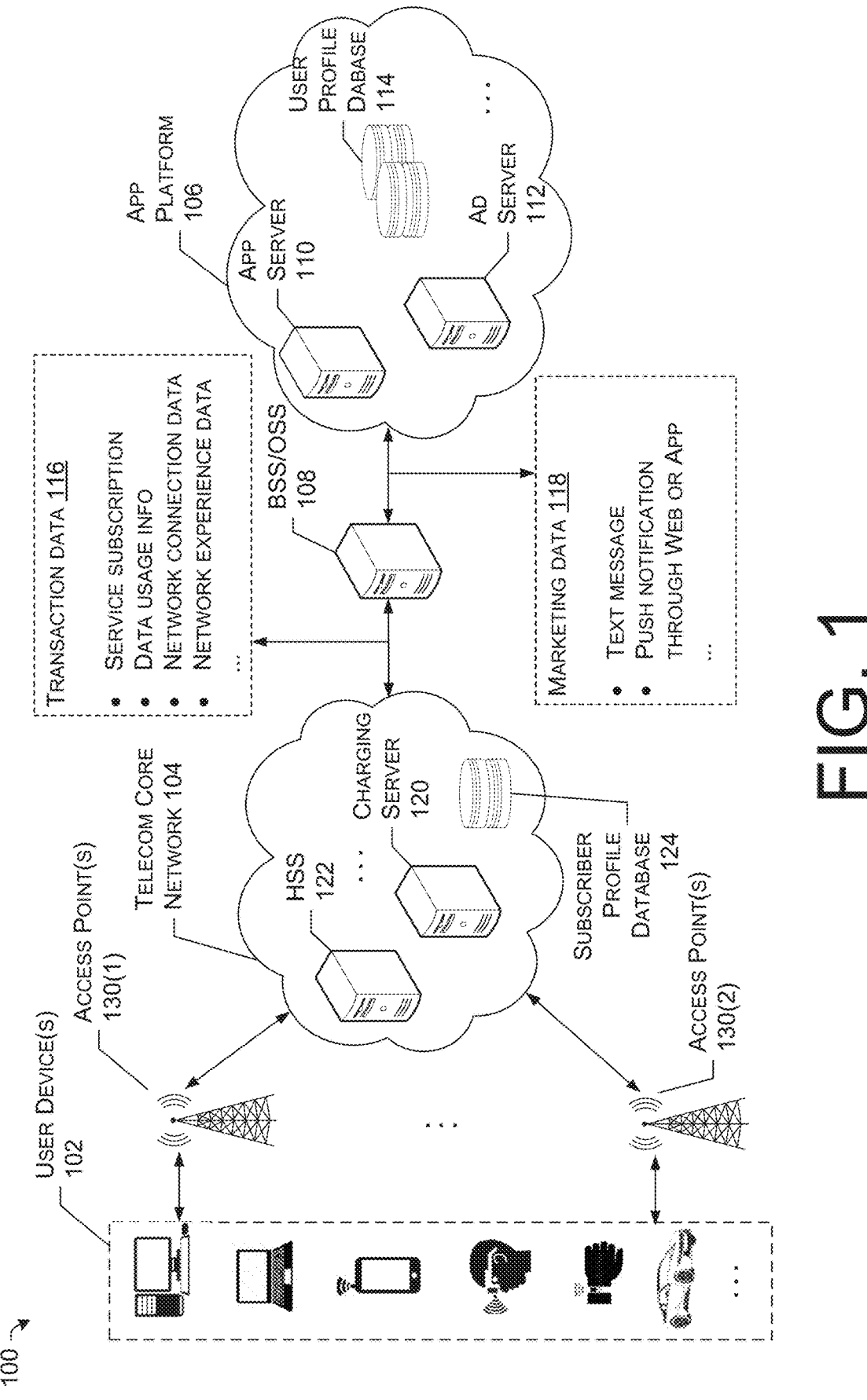
FIG. 1 illustrates an example network scenario, in which distributed mobile subscription management is implemented, according to an example of the present disclosure.

Techniques for distributed mobile subscription management, are disclosed herein.

In implementations, a computer server on a third-party computer platform may obtain information related to services provided by a telecommunication carrier. The computer server may generate advertisements of the services and present the advertisements on a graphical user interface (GUI) of an app installed on a user device, the app being associated with the third-party computer platform. The computer server may further receive a user interaction to select the service on the GUI of the app. In response to the selection, the computer server may sequentially provide one or more user interfaces on the GUI of the app to guide the user to input data necessary for completion of the subscription. In particular, the partnership between the app server and the telecommunication carrier may enable an instant subscription of the service provided by the telecommunication carrier for the user using an embedded subscriber identity module (eSIM) based at least in part on user profile associated with the app.

In some examples, the third-party computer platform may be any platforms that already engage a large number of users/subscribers, for example, social media platform, online gaming platform, video streaming platform, fitness & wellness platform, online shopping platform, etc. The third-party computer platform may partner with the telecommunication carrier to facilitate an instant subscription of the service using eSIM through the third-party computer platform.

In implementations, the computer server may provide one or more user interfaces on the GUI of the app that allow the user to input personal information through the one or more user interfaces. In some examples, at least part of the personal information may be directly retrieved from a user profile database of the third-party computer platform. Sensitive personal data such as payment information, credit card number, personal identifiable information (PII), social security number (SNN) may be additionally inputted by the user. The computer server may send the personal information of the user to a server device associated with the telecommunication carrier, causing the server device to validate the personal information of the user.

In implementations, the computer server may obtain equipment identity information through inputs on the one or more user interfaces. The equipment identity information may be an international mobile equipment identity (IMEI) number associated with a mobile device. The computer server may send the equipment identity of the mobile device to the server device associated with the telecommunication carrier, causing the server device to validate an eligibility of the mobile device for embedded subscriber identity module (eSIM) based on the equipment identity. In some examples, the computer server, e.g., the third-party platform, may be privileged to obtain the IMEI information directly from the mobile device. In some examples, the computer server may call the mobile device directly for required device characteristics and send it to the telecommunication carrier to determine the compatibility and/or eligibility of the mobile device with eSIM.

Once the personal information of the user and the eligibility of the mobile device for eSIM are validated, the computer server may install an eSIM profile on the mobile device and create a subscriber profile with the telecommunication carrier for the user based at least in part on user profile associated with the app and the additional data inputted by the user. The service may be instantly activated once the eSIM is successfully installed on the mobile device.

In some examples, the service may be activated as free for a period of time. After the service is activated, network experience and data usage associated with the user may be analyzed through the telecommunication carrier. A network experience score and a data usage report may be accessible on the mobile device. The network experience score may indicate an overall network performance on the telecommunication carrier, a percentage of time the mobile device is connected to the telecommunication carrier's network comparing to the time connected to another carrier's network, etc.

Before the free trial ends, the computer server may send a notification to the user. If the user chooses to switch from his/her current carrier to the telecommunication carrier, the computer server may provide further additional user interfaces to allow the user to input for paid subscription such as, social security number, credit card information, mailing address, etc., if not collected through free trial activation. In some examples, the computer server may further provide information on service upgrading and add-ons through the app, e.g., the third-party platform. The subscriber may upgrade the service and implement the add-ons through clicking the information on the app.

As discussed herein, the third-party platform may have the user's profile and payment information. After the user activates the eSIM subscription via a click through the information displayed on the GUI of the app, the payment information may be shared with a charging server of the telecommunication carrier. In some examples, the payment may be made through the third-party platform partnered with the telecommunication carrier.

According to the present disclosure, the telecommunication carrier may partner with a third-party computer platform to complete the subscription process through the third-party computer platform. A mobile service provided by the telecommunication carrier may be activate instantly using eSIM technology in response to a click on an advertisement presented on the GUI of the app associated with the third-party computer platform. The present disclosure may greatly improve the efficiency of activating the mobile services and drive the engagement of users to the telecommunication carrier's service.

Although paid advertising through the third-party computer platform is used herein as an example to engage users, the present disclosure is not intended to be limiting. Various resources and/or channels including but are not limited to, the social media posts from the telecommunication carrier, the third-party platform marketplaces such as Amazon and eBay, outbound messages such as WhatsApp message and Twitter messages, etc., may also be used to engage the user to sign up for new services.

The techniques discussed herein may be implemented in a computer network using one or more of protocols including but are not limited to Ethernet, 3G, 4G, 4G/LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario, in which distributed mobile subscription management is implemented, according to an example of the present disclosure.

As illustrated in FIG. 1, the network scenario 100 may include a business support system/operation support system (BSS/OSS) 108 that bridges the operations of a telecom core network 104 and an app platform 106 (e.g., a third-party platform) to manage the mobile subscription made through the app platform 106. Although shown as apart from the telecom core network 104, the BSS/OSS 108 is a critical entity of the telecom core network 104 that is configured to perform product management, order management, customer services provisioning, revenue management, customer management, etc.

In some examples, the BSS/OSS 108 may provide marketing data 118 associated with the services provided through the telecommunication carrier to the app platform 106. The marketing data 118 from the telecommunication carrier may be managed by an ad server 112 on the app platform 106. An app server 110 on the app platform 106, upon detecting a launch of the website or the app on one of user device(s) 102, may cause the ad server 112 to push the content of the marketing data 118 to be displayed on a graphical user interface (GUI) of the website or the app. The marketing data 118 may include an advertisement to download an eSIM to activate a variety of services and/or bundles of services provided by the telecommunication carrier. In some other examples, the marketing data 118 may be pushed directly from the side of the telecom core network 104 in text messages, phone calls, or emails, etc.

The app server 110 may further monitor user interactions with the marketing data 118 presented on the GUI of the website or the app associated with the app platform 106. For example, the user may click a link embedded in the marketing data 118 with respect to the services provided through the telecom core network 104. The link may lead to a series of steps to subscribe to try the services with downloading eSIM. Upon detecting the click of the link in the marketing data 118, the app server 110 may generate one or more user interfaces to be sequentially displayed on the GUI of the website or the app to guide the user to download eSIM and subscribe to the services provided by the telecommunication carrier. The app server 110 may obtain the data necessary to activate the services via inputs on the one or more user interfaces. If the user already has a profile with the app platform 106, the app server 110 may populate the data necessary to activate the services from a user profile database 114 located on the app platform 106. In some examples, the data necessary to activate the service may include a full name of the user, a mailing address of the user, a contact phone number of the user, etc. Additionally, the data necessary to activate the service may include payment information previously saved in the user profile database 114.

In some examples, the app server 110 may provide the user interface to collect equipment identify information to verify whether the user device is eligible to use eSIM. For example, the app server 110 may provide the user interface for the user to input an international mobile equipment identity (IMEI) number associated with the user device 102. The app server 110 may send the IMEI number to the BSS/OSS 108 via an application program interface (API), causing the BSS/OSS 108 to determine whether the user device 102 is compatible with eSIM based at least in part on the IMEI number. In some other examples, the app server 100 may be privileged by the device OEM, e.g., the telecommunication carrier app or native Android OS functionality, to have the ability to bypass collecting IMEI. The app server 100 may instead, call the user device directly for the required device characteristics. The app server 100 may send the required device characteristics to the BSS/OSS 108 for eSIM activation.

After the data necessary to activate the service is verified by the user and the user device 102 is determined to be compatible with eSIM, the app server 110 may present the user interface for the user to download eSIM from an eSIM app or software provider. The services may be instantly activated once eSIM is installed on the user device 102.

In another example, the app server 110 may present the marketing data 118 on the GUI of the website or the app including a second link to renew the services when the try period is about to end. Once the user's click of the second link on the GUI is detected, the app server 110 may generate one or more additional user interfaces to be displayed on the GUI to guide the user to complete the renewal process. The app server 110 may collect additional information from the user to complete the renewal of the services. In some examples, the additional information may include payment information such as credit card information, if not collected during activating the services for the try period. The payment information may be collected via input on one of the additional user interfaces or populated from the user profile database 114. In some examples, the additional information may further include user identity information such as the social security number. The app server 110 may send the additional information to the BSS/OSS 108 through a secured API, causing the BSS/OSS 108 to validate the additional information. The services may be instantly renewed for the user once the additional information is validated.

As discussed herein, the subscription of the service is initiated by a user click on the ad pushed to the mobile app and completed through the app platform 106. Once the service is activated, the BSS/OSS 108 may create a subscriber profile based at least in part on the user profile on the app platform 106, the payment information, the user identity information, and the device information. The subscriber profile may be further saved to a subscriber profile database 124 on the telecom core network 104. In implementations, the subscriber profile database 124 is accessible to a home subscriber server (HSS) 122 and a charging server 120 on the telecom core network 104. Subsequently, transaction data 116 may be exchanged between the telecom network 104 and the app platform 106. In addition to the service subscription data, the transaction data 116 may further include data usage occurred on the app platform 106 and/or other platforms, charging/billing information based on the data usage, network connection data, network experience data, etc. In some examples, upon receiving the service subscription data, the HSS 112 may create a subscriber profile for the user based at least in part on the service subscription data passed from the app platform 106 and save the subscriber profile in the subscriber profile database 124. In another example, upon receiving the charging/billing information from the app platform 106, the charging server 120 may update the subscriber's account based on the received charging/billing information.

The telecom core network 104 may be associated with a wireless service provider such as, T-Mobile, AT&T, Verizon Wireless, etc. The telecom core network 104 may be a 4G evolved packet core (EPC) network or a 5G core network. In implementations, the telecom core network 104 may be connected to one or more IP multimedia subsystems (IMSs) and one or more access networks through which, the user device(s) 102 can connect to the telecom core network 104 and the IMSs. The one or more access networks may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM)

technology, WiMAX technology, Wi-Fi technology, and/or any other previous or future generation of radio access technology.

The user device(s) 102 may be connected to the telecom core network 104 through one or more access points, e.g., access point(s) 130(1) and 130(2) (hereinafter referred to as 130). The access point 130 may include various types of base stations that are compatible with one or more radio access technologies (RATs), protocols, and/or standards, such as, 2G base stations and/or 3G NodeBs that are compatible with GSM and CDMA technologies, eNBs that are compatible with an Evolved UMTS Terrestrial Radio Access Network (E-UTRAN) technology, or gNBs that are compatible with new radio (NR) technology in 5G network.

In some examples, once a user device 102 activated the service through eSIM while using the app on the device, the BSS/OSS 108 may obtain subsequent data usage information from the app platform 106 periodically. The data usage information may be generated based on various user interactions with the app installed on the user device 102. The user device 102 may periodically send the data usage information to the associated access point, which is further transmitted to the app platform 106 through the telecom core network 104. For instance, the data usage information may indicate the user engages in online games more often than browsing news or online shopping. In another example, the BSS/OSS 108 may also obtain network connection data from a function element (e.g., an access and mobility control function) of the telecom core network 104 periodically. For instance, the network connection data may include a time period per day that the user device 102 is connected to the telecom core network 104. In yet another examples, the BSS/OSS 108 may also obtain network performance data from the telecom core network 104. For instance, the network performance data may indicate whether the user device 102 switched from 5G connection to 4G/LTE connection, an estimated ratio that the user device 102 experienced dropped call in a time period, etc.

In some examples, based on the data usage information, the network connection data, the network performance data, etc., the BSS/OSS 108 may determine a service package after a free trial period, or whether an add-on service/an upgrading of the current service would be a potentially interest to the user. The BSS/OSS 108 may further generate one or more analysis summaries related to the network experience and present the analysis summaries with new advertising content on the app user interface.

The user device(s) 102 may be a mobile device, such as a cellular phone or a smart phone, a personal digital assistant (PDA), a media player, a tablet computer, a gaming device, a personal computer (PC) such as a laptop, desktop, or workstation, or any other type of computing or communication device. In some examples, the user device(s) 102 may include the computing devices implemented on the vehicle such as an autonomous vehicle or a self-driving vehicle. In some other examples, the user device(s) 102 may be a wearable device such as a smart watch, smart glasses, etc.

As discussed herein, in conventional ways of using the physical SIM card, the user has to purchase the SIM card in a local store partnering with the telecommunication carrier, which causes the user an extra trip to visit the local store. Alternatively, the user has to wait for the arrival of the SIM card in mail to activate the services on the carrier website or by calling the activation line. The present disclosure enables the subscription to the mobile services using eSIM and through any third-party platform partnering with the telecommunication carrier. In implementations, the user profile already created on the third-party platform may be used to activate the mobile services. Further, the validation of any additional information of the user may be performed on the backend between the third-party platform and the telecommunication carrier. The subscription process, from the view of the user, can be simply completed by one click on the marketing data pushed to the GUI of the mobile app, and therefore, greatly improving the user subscription experience.

Figure 2:
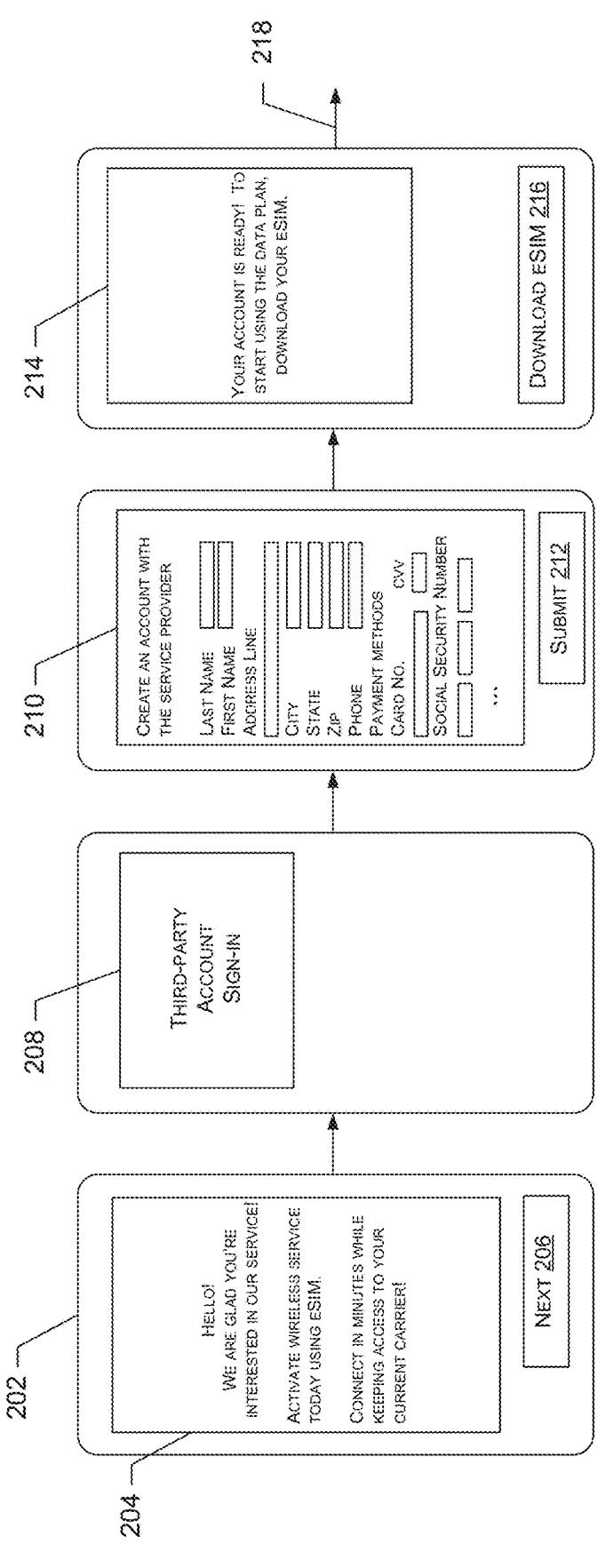
FIG. 2 illustrates example graphical user interfaces, through which distributed mobile subscription management is implemented, according to an example of the present disclosure.

FIG. 2 illustrates example user interfaces, through which distributed mobile subscription management is implemented, according to an example of the present disclosure.

The example user interfaces 200 may include a series of user interfaces that are presented on GUI 202 of a mobile app to guide the user to complete the subscription to the services provided by a telecommunication carrier. In implementations, the example user interfaces 200 may be generated by the app platform 106 based at least in part on the marketing data 118 provided by the BSS/OSS 108, as shown in FIG. 1.

After the user clicks an advertisement to try a service, a user interface 204 may be presented on the GUI 202. The user interface 204 may include information related to the services and/or plans that are available to activate using eSIM. In implementations, the user's click on the advertisement on the GUI 202 may generate an API call to an ad server on the third-party platform (e.g., the ad server 112 as shown in FIG. 1). In response, the ad server on the third-party platform may retrieve the information based on the marketing data from the telecommunication carrier and send the information to be displayed on the user interface 204. For example, information displayed on the user interface 204 may indicate to download an eSIM and get 30 days or up to 30 GB of data with unlimited talk and text. The information displayed on the user interface 204 may further indicate that activating eSIM with the telecommunication carrier may still keep access to the user's current carrier. When the user clicks the next button 206, the user may be presented with a user interface 208 to allow the user to sign in the third-party platform account. In some examples, the third-party account may be associated with any third-party platform that has a number of users or subscribers such as social media platform, e-commerce platform, wellness & fitness platform, financial service platform, etc. The user may have already established a profile with the third-party platform including but not limited to personal information, contact information, payment information, etc.

Once the user signs in using his/her third-party platform, a user interface 210 may be presented on the GUI 202 that allows the user to create an account with the service provider. Information collected through the user interface 210 may include the user's last name, first name, address, phone number, etc. In some examples, payment information and personal identity information may also be collected in order to activate monthly subscription services. In some examples, information such as the user's last name, first name, address, phone number may be retrieved from a user profile database on the third-party platform (e.g., user profile database 114 shown in FIG. 1) and populated on the user interface 210. Upon the information displayed on the user interface 210 is verified and a submit button 212 is clicked by the user, a user interface 214 may be presented on the GUI 202 to notify the user that the account is ready and to download the eSIM to start using the services. When the user clicks a download eSIM button 216, an API call 218 may be generated from the GUI 202 to a provider to download the eSIM to the user device.

Figure 3:
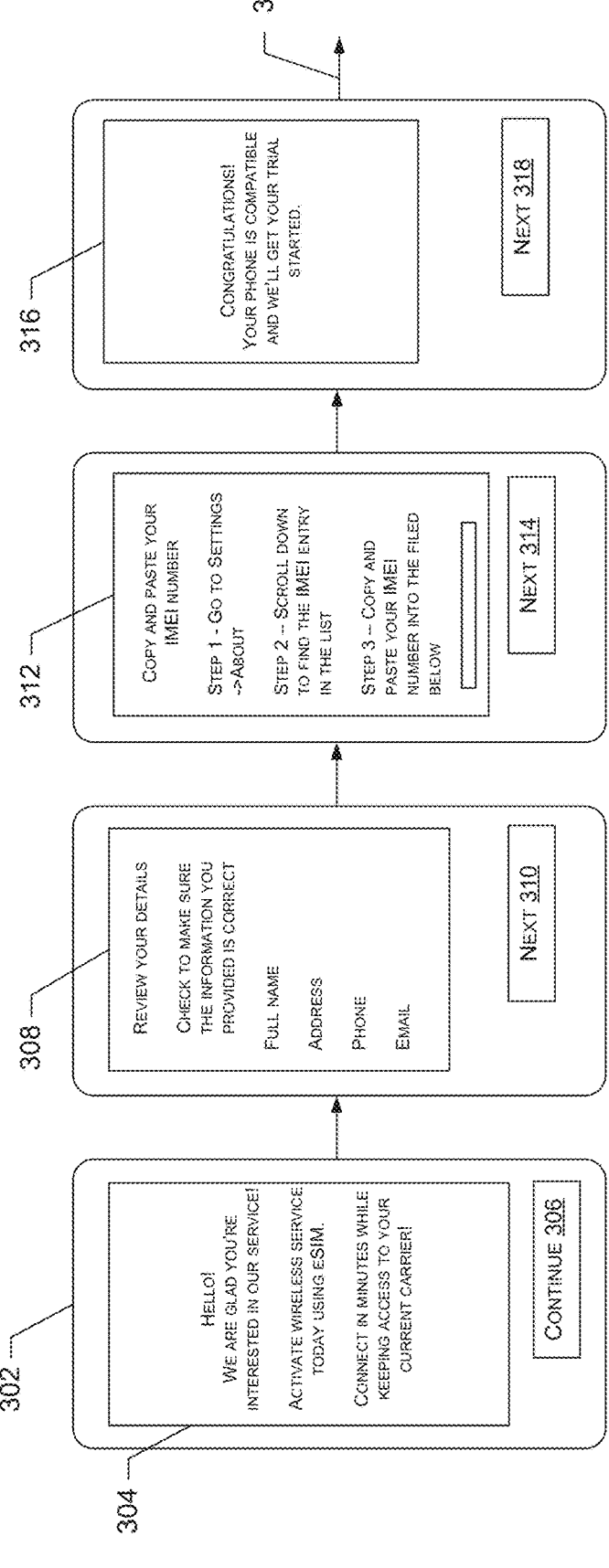
FIG. 3 illustrates example graphical user interfaces, through which distributed mobile subscription management is implemented, according to another example of the present disclosure.

FIG. 3 illustrates example graphical user interfaces, through which distributed mobile subscription management is implemented, according to another example of the present disclosure.

The example user interfaces 300 may include a series of user interfaces that are presented on GUI 202 of a mobile app to guide the user to complete the subscription to the services provided by a telecommunication carrier, according to another implementation. The example user interfaces 300 may be generated by the app platform 106 based at least in part on the marketing data 118 provided by the BSS/OSS 108, as shown in FIG. 1.

As shown in FIG. 3, a user interface 304 may be presented on GUI 302 of the app associated with a third-party platform. Similar to the user interface 204, the user interface 304 may include information related to the services and/or plans that are available to activate using eSIM. The user's click on a continue button 306 on the user interface 304 may cause a subsequent user interface 308 to be displayed on the GUI 302. The user interface 308 may guide the user to review the details on the personal information inputted through the user interface 308 or populated from the user profile with the third-party platform. Once the personal information is verified and a next button 310 is clicked by the user, a user interface 312 may be displayed on the GUI to guide the user to input the identify information of the user device. For example, the user interface 312 may provide a step-by-step guidance to locate the IMEI number on the user device. When the user inputs the IMEI number on the user interface 312 and clicks a next button 314, a user interface 316 may be displayed on the GUI to notify the user that his/her user device is compatible with eSIM and he/she can start trying the service once eSIM is installed. When the user clicks a next button 318, an API call 320 may be generated from the GUI 302 to a provider to download the eSIM to the user device. In some other examples, when the third-party platform is privileged by the device OEM to have the ability to bypass collecting IMEI information, the user interface 312 may display information that indicates the required device characteristics for eSIM activation is acquired and waiting for validation. Once the required device characteristics for eSIM activation is validated, the user interface 316 may be displayed on the GUI to notify the user that his/her user device is compatible with eSIM.

Figure 4A:
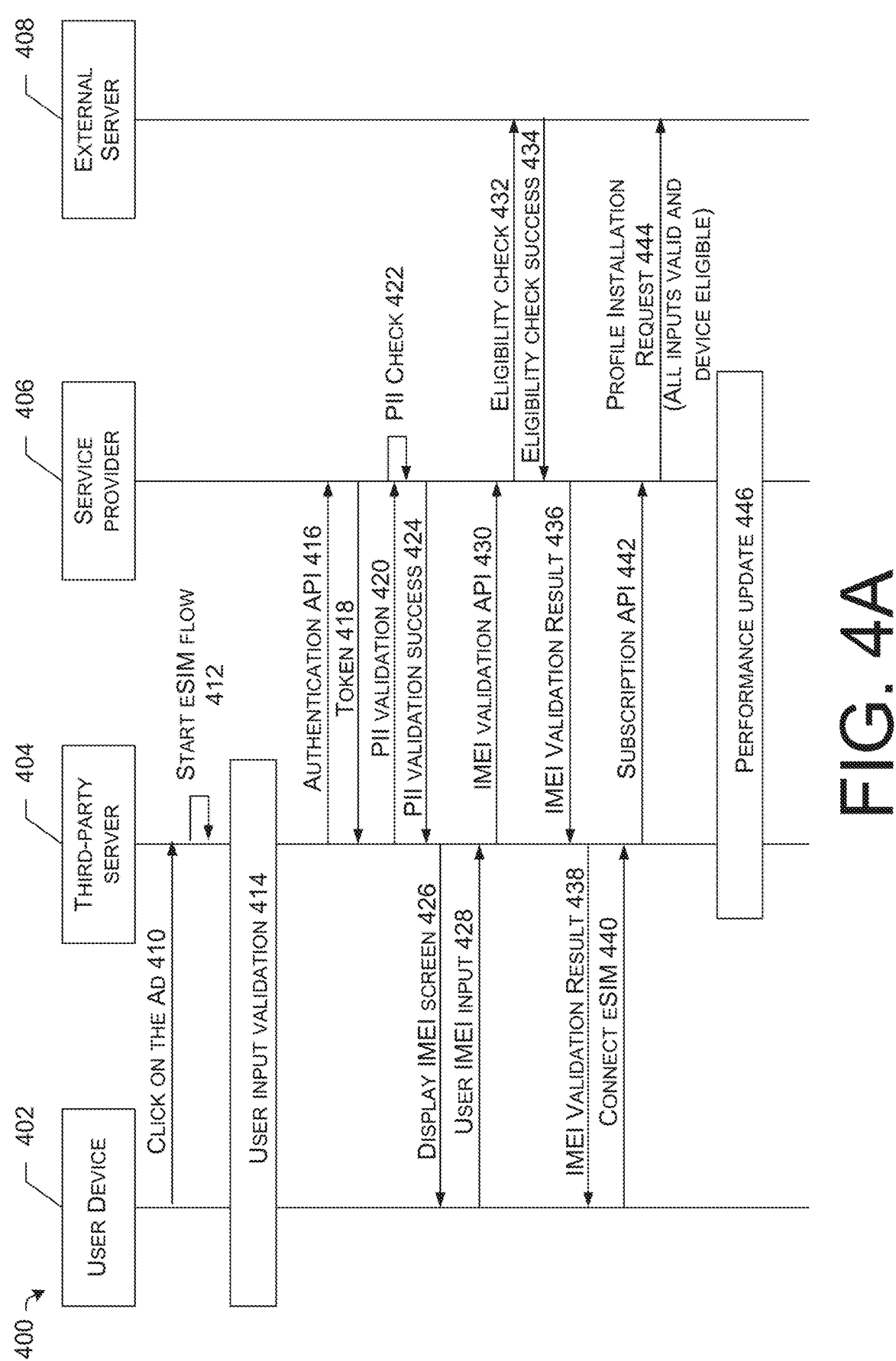
FIG. 4A illustrates an example architecture for distributed mobile subscription management, according to an example of the present disclosure.

FIG. 4A illustrates an example architecture for distributed mobile subscription management, according to an example of the present disclosure. The example architecture 400 may illustrate a workflow between multiple entities to activate a service provided by a telecommunication carrier through a third-party platform.

As shown in FIG. 4A, a user may click on an ad displayed on an app GUI on a user device 402 at step 410. The user may interact with the ad via a touch screen of the mobile device. The click on the ad is captured by the touch screen of the mobile device and sent to a third-party server 404 associated with the app. Upon receiving the user interaction, the third-party server 404 may start an eSIM flow at step 412.

In some examples, the eSIM flow may start with providing one or more user interfaces through the app GUI on the user device 402 to collect information required to activate eSIM on the user device 402. User input on the one or more user interfaces may be validated at step 414. The user input may relate to personal information, contact information, payment information, identity information of the user, etc. In some examples, at least some of the personal information, contact information, and payment information may be retrieved from the user profile associated with the third-party platform (e.g., the user profile database 114). In some examples, validation of the user input may be performed by a financial service and/or personal identity service.

Once the information is validated, the third-party server 404 may send a request through an authentication API to a service provider 406 at step 416. As discussed herein, authentication from the service provider, e.g., a telecommunication carrier, may be required for the third-party server to activate eSIM through its mobile app. When the request is authenticated, the service provider 406 may send a token back to the third-party server 404 at step 418.

The third-party server 404 may further send a personally identifiable information (PII) validation request to the service provider 406 at step 420. As discussed herein, the PII is used to confirm the user's identity and may include sensitive information such as payment information and social security number. The service provider 406 may perform PII check at step 422. In implementations, the service provider 406 may validate the payment information via a financial service and validate the social security information via a personal identity service. If the PII of the user is validated, the service provider 406 may send a PII validation success message back to the third-party server at step 424.

Once the information related to the user is validated, the third-party server 404 may display an IMEI screen on the user device 402 at step 426. The user may provide the IMEI input at step 428. Upon receiving the IMEI input, the third-party server 404 may send a request to validate IMEI of the user device in an IMEI validation API to the service provider 406 at step 430. The service provider 406 may further forward the IMEI input to an external server 408 to perform eligibility check of the user device 402 at step 432. If it is determined that the user device 402 is compatible with eSIM based on the IMEI input, the external server 408 may return an eligibility check success message to the service provider 406 at step 434. If the user device 402 is not compatible with eSIM, the external server 408 may return an error message to the service provider 406 at step 434. The IMEI validation result may be further forwarded to the third-party server 404 at step 436 and to the user device 402 at step 438.

Once the user's identity information and the device's eligibility for eSIM are both validated, the user device 402 may generate a request to connect eSIM and send the request to connect eSIM to the third-party server 404 at step 440. In response, the third-party server 404 may call a subscription API at step 442, causing the service provider 406 to send a profile installation request to the external server at step 444. After eSIM is installed on the user device 402 and a profile is created for the user at the service provider's network, the service is activated for the user to use. The service provider 406 may call a performance API to obtain performance related data from the third-party server 404 and run performance update at step 446.

Figure 4B:
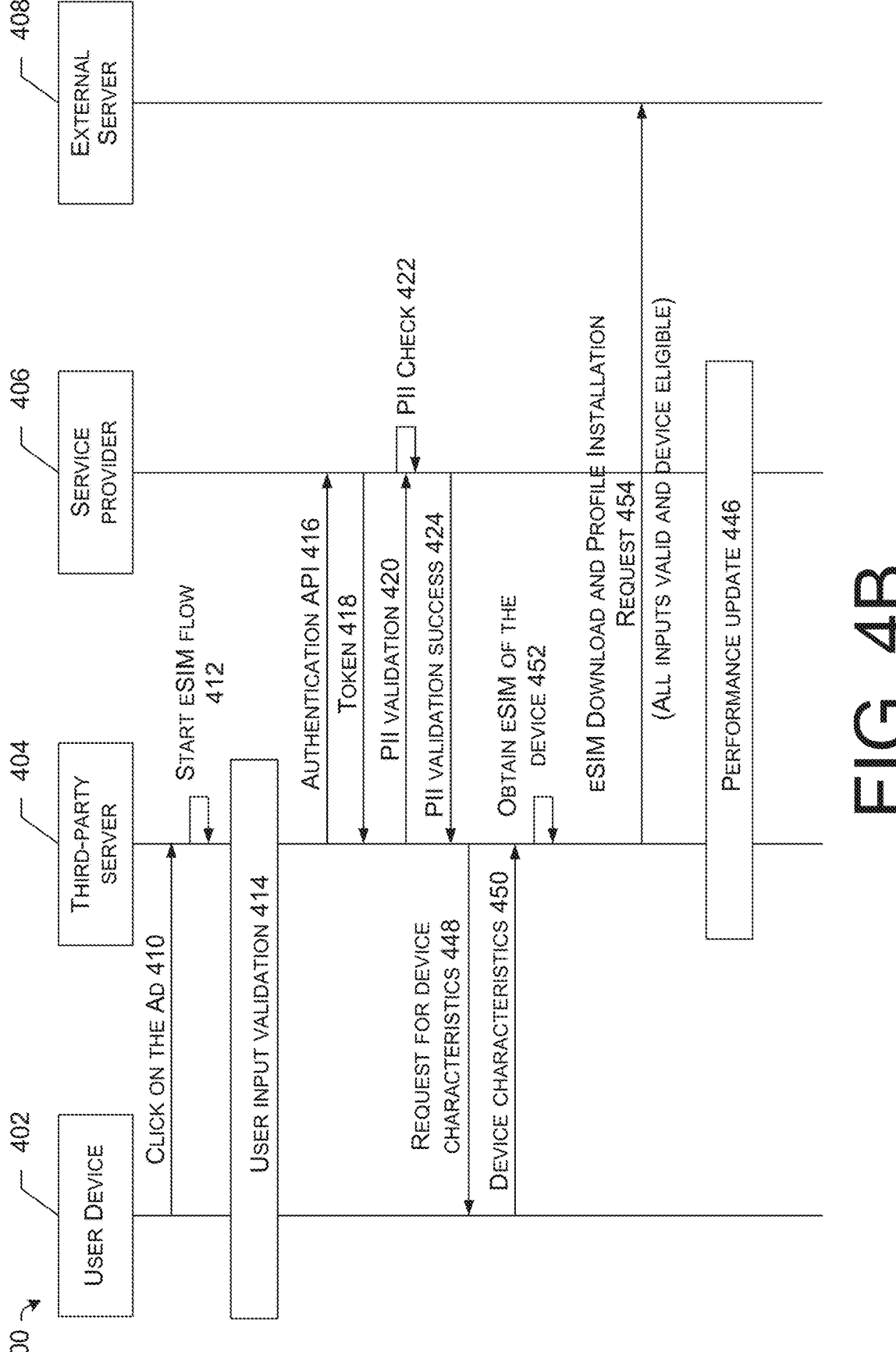
FIG. 4B illustrates another example architecture for distributed mobile subscription management, according to another example of the present disclosure.

FIG. 4B illustrates another example architecture for distributed mobile subscription management, according to another example of the present disclosure.

According to the example shown in FIG. 4B, the third-party server 404 may be privileged by the device OEM to have the IMEI information for various types of user devices. The third-party server 404 may request the device characteristics from the user device 402 at step 448. By way of example and without limitation, the device characteristics may include carrier unlock status, open eSIM slots, device dual service dual standby status, supported bands, etc. The user device 402 may send the device characteristics to the third-party server 404 at step 450. The third-party server 404 may obtain eSIM of the device from a local storage at step 452 and send an eSIM download and profile installation request to the external server 408 at step 454.

Figure 5B:
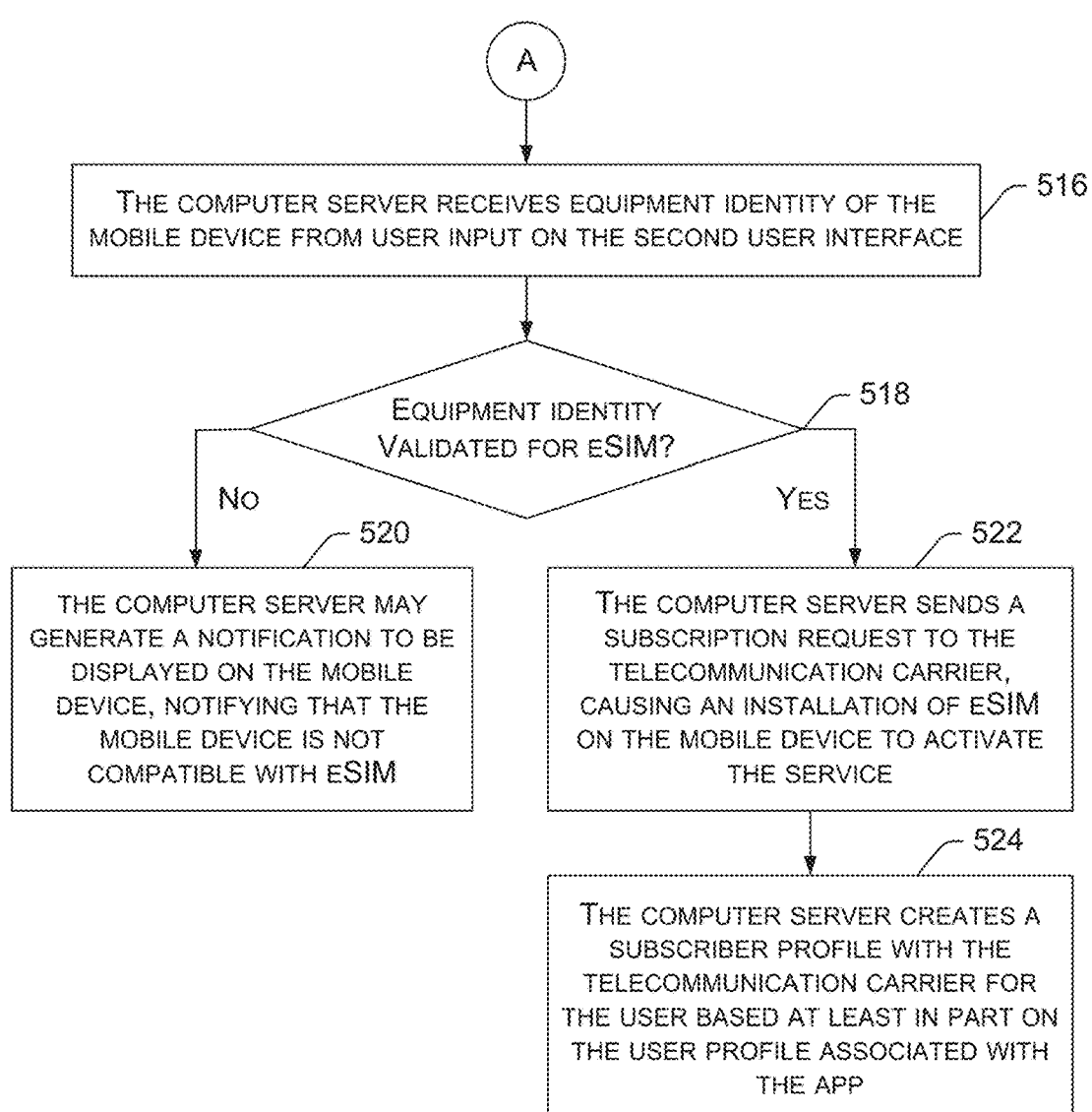

FIGS. 5A-5B illustrate an example process for distributed mobile subscription management, according to an example of the present disclosure. The example process 500 may be performed by a computer server residing on a third-party platform, where the computer server bridges the third-party platform and the telecommunication carrier's network such as the app server 110 on the app platform 106, as shown in FIG. 1.

At operation 502, a computer server may provide information of a service on a graphical user interface (GUI) of an app on a mobile device, the service being provided by a telecommunication carrier. As discussed herein, the information of the service may be provided by a business operation unit of the telecommunication carrier, for example, the BSS/OSS 108 as shown in FIG. 1. The service provided by the telecommunication carrier may include data service, voice service, text service, etc. In some examples, the information of the service may also offer activating the service using eSIM.

At operation 504, the computer server may detect a user interaction to select the service on the graphical user interface of the app. The user interaction may be captured when the user clicks a touch screen of the mobile device. When a selection of the service on the graphical user interface of the app is detected, the app on the mobile device may transmit data corresponding to the selection of the service to the computer server a network.

At operation 506, the computer server may provide a first user interface on the GUI of the app to allow input of personal information of the user. Based on the selection of the service, the computer server may provide one or more user interfaces for the user to input the information necessary to activate the service for the user. In some examples, the service is provided with a try period, the computer server may provide the one or more user interfaces to allow input of the personal information and equipment identity information. In some other examples, the service is provided with a monthly subscription, the computer server may provide additional user interfaces to allow input of payment information and personally identifiable information (PII).

At operation 508, the computer server may retrieve a user profile of the user associated with the app and populate a first portion of the personal information based on the user profile. As discussed herein, the user may have registered through the app and created a user profile. The computer server may retrieve the user profile from a user profile database located on the app platform and populate at least a portion of the personal information based on the user profile. For example, when registering through the app platform, the user's full name, address, contact information, etc., may be provided and saved in a database, e.g., the user profile database 114 as shown in FIG. 1.

At operation 510, the computer server may receive a second portion of the personal information from user input on the first user interface. As discussed herein, the service may be provided in a monthly subscription plan. The computer server may require additional information to activate the service. In some examples, the additional information may include payment information such as credit card information, PayPal information, Venmo information, etc. In yet other examples, the additional information may include personal identity information such as a social security number (SSN).

At operation 512, the computer server may determine whether the personal information can be validated. In some examples, the computer server may determine whether the user's full name, mailing address, and phone number are genuine. In yet another example, the computer server may check whether the credit card number that the user provided is correct by inquiring the credit card company. In yet another example, the computer server may check whether the SSN of the user by inquiring the SSN administrative service.

If the personal information cannot be validated, the process returns to operation 502. If the personal information can be validated, at operation 514, the computer server may provide a second user interface on the GUI of the app to allow input of device information.

At operation 516, the computer server may receive equipment identity of the mobile device from user input on the second user interface. In some examples, the equipment identity of the mobile device may include an IMEI number of the mobile device.

At operation 518, the computer server may determine whether the mobile device is compatible with eSIM based on the equipment identity. In some examples, the computer server may search the IMEI number in a list of compatible devices to determine whether the mobile device is eligible to install eSIM. In some examples, device characteristics may be alternatively used to determine whether the mobile device is compatible with eSIM activation.

If the mobile device is not compatible with eSIM, the computer server may generate a notification to be displayed on the mobile device, notifying that the mobile device is not compatible with eSIM at operation 520. If the user further decides to try the service using a physical SIM card, upon receiving the indication on the user interface, the computer server may generate an order to ship a SIM card to the user to activate the service.

If the mobile device is compatible with eSIM, at operation 522, the computer server may send a subscription request to the telecommunication carrier, causing an installation of eSIM on the mobile device to activate the service. In implementations, the subscription request may be received by the BSS/OSS 108 shown in FIG. 1 and is further forwarded to an eSIM provider. The eSIM provider may then download and install eSIM on the mobile device.

Figure 6:
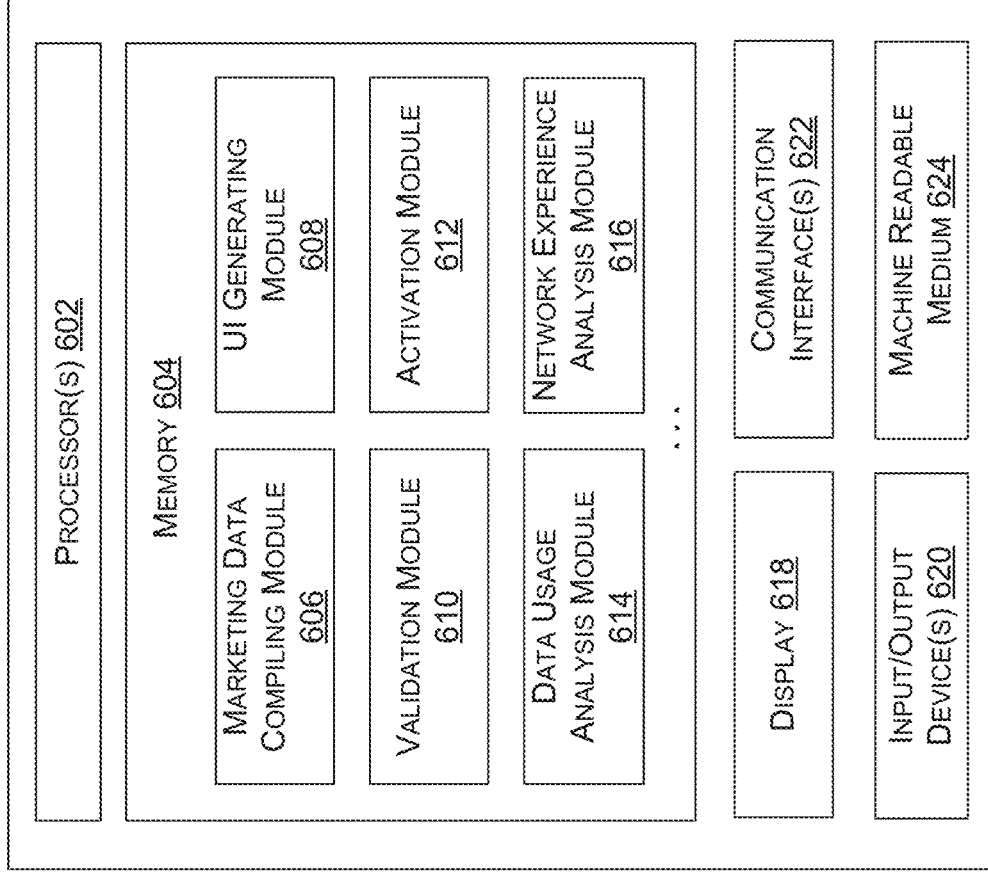
FIG. 6 illustrates an example computer server, in which distributed mobile subscription management is implemented, according to an example of the present disclosure.

At operation 524, the computer server may create a subscriber profile with the telecommunication carrier for the user based at least in part on the user profile associated with the app. As discussed herein, a try of the service may be activated using only the user profile on the third-party platform FIG. 6 illustrates an example computer server, in which distributed mobile subscription management is implemented, according to an example of the present disclosure. The example computer server 600 may be implemented on a third-party computer platform such as a social media platform that already engages a large number of users/subscribers, for example, the app server 110 shown in FIG. 1. Alternatively, the example computer server 600 may be implemented on a computer platform that partners with the third-party computer platform and the telecommunication carrier.

As illustrated in FIG. 6, the computer server 600 may comprise processor(s) 602, a memory 604 storing a marketing data compiling module 606, a UI generating module 608, a validation module 610, an activation module 612, a data usage analysis module 614, a network experience analysis module 616, a display 618, input/output device(s) 620, communication interface(s) 622, and/or a machine readable medium 624.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer server 600. Any such non-transitory computer-readable media may be part of the computer server 600.

The marketing data compiling module 606 may be configured to compile the marketing data provided by the telecommunication carrier. As discussed herein, the marketing data from the telecommunication carrier may include a variety of services provided by the carrier. The marketing data compiling module 606 may generate a plurality of advertisements in different categories based on the marketing data, aiming different types of user/subscribers. For examples, for users fond of watching videos and/or playing video games, the marketing data compiling module 606 may recommend a service with large or unlimited data plan.

The UI generating module 608 may be configured to generate multiple user interfaces (UIs) in response to a user interaction to select a service on an app GUI. The multiple user interfaces may be presented on a user device in a series of steps to guide the user to complete the steps to subscribe to the service provided by the telecommunication carrier. The multiple user interfaces may allow the users to input personal information and device information necessary to instantly activate the service using eSIM.

The validation module 610 may be configured to validate the information inputted through the multiple user interfaces. In some examples, the validation module 610 may validate the user's PII and the IMIE of the user device through third-party agencies. In some examples, the validation module 610 may forward the user's PII and the IMIE of the user device to an entity of the telecommunication carrier to perform validation check, e.g., the BSS/OSS 108, as shown in FIG. 1.

The activation module 612 may be configured to activate the service by installing eSIM app or software on the user device. Once the user's PII and the IMIE of the user device are validated, the UI generating module 608 may generate another user interface to present on the user device to guide the user to download eSIM app or software. Upon eSIM is installed on the user device, the activation module 612 may send a notification to the entity of the telecommunication carrier, causing the activation of the service on the carrier's network and creation of a subscriber's profile with the carrier. In some examples, the activation module 612 may be configured to share the personal information saved in the app platform to the telecommunication carrier so that the carrier can create the profile for the user based at least in part on the personal information of the user saved in the app platform.

The data usage analysis module 614 may be configured to analyze the data usage on the app platform. In some examples, the data usage analysis module 614 may analyze the user activities while using the app and the click-through activities. For examples, the data usage analysis module 614 may provide information related to the amount of data being used during a certain period of time and on which types of apps the data is being used.

The network experience analysis module 616 may be configured to analyze the connection data related to the user device being connected to the telecommunication carrier's network during a certain period of time. For example, a Verizon subscriber may choose to try a T-Mobile data service provided through Facebook while keeping his/her Verizon subscription. The network experience analysis module 616 may measure an overall quality of the connection of the user device to the T-Mobile network and a percentage of the user device being connected to the T-Mobile network rather than Verizon. When the try period ends, the analysis results from the data usage analysis module 614 and the network experience analysis module 616 may be presented through the app GUI as a reference to the user.

The communication interface(s) 622 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 622 can be compatible with multiple radio access technologies, such as 5G radio access technologies and 4G/LTE radio access technologies. Accordingly, the communication interfaces 622 can allow the computer server 600 to connect to the 5G system described herein.

Display 618 can be a liquid crystal display or any other type of display commonly used in the computer server 600. For example, display 618 may be a touch-sensitive display screen and can then also act as an input device or keypad, such as for providing a soft-key keyboard, navigation buttons, or any other type of input. Input/output device(s) 620 can include any sort of output devices known in the art, such as display 618, speakers, a vibrating mechanism, and/or a tactile feedback mechanism. Input/output device(s) 620 can also include ports for one or more peripheral devices, such as headphones, peripheral speakers, and/or a peripheral display. Input/output device(s) 720 can include any sort of input devices known in the art. For example, input/output device(s) 620 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 624 can store one or more sets of instructions, such as software or firmware, that embodies any one or more of the methodologies or functions described herein. The instructions can also reside, completely or at least partially, within the memory 604, processor(s) 602, and/or communication interface(s) 622 during execution thereof by the computer server 600. The memory 604 and the processor(s) 602 also can constitute machine readable media 624.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer system comprising:

a memory storing instructions; and one or more processors configured to execute the instructions to perform operations including:

providing information of a service on a graphical user interface of an app on a mobile device, the service being provided by a telecommunication carrier;

receiving a selection of the service from on the graphical user interface of the app;

in response to the selection, providing one or more user interfaces on the graphical user interface of the app enabling a subscription of the service for a user based at least in part on a user profile associated with the app;

receiving, via the one or more user interfaces, an equipment identity of the mobile device;

validating, based at least in part on the equipment identity of the mobile device, an eligibility of the mobile device for an embedded subscriber identity module (eSIM);

causing, based at least in part on the eligibility of the mobile device for the eSIM, at least one of the eSIM or an eSIM profile associated with the eSIM to be downloaded to, or installed on, the mobile device; and causing the subscription for the service to be activated based at least in part on the at least one of the eSIM or the eSIM profile, being downloaded to, or installed on, the mobile device.

2. The computer system of claim 1, wherein the operations further include:

providing a first user interface of the one or more user interfaces;

receiving, via the first user interface, personal information of the user based at least in part on the user profile associated with the app; and sending the personal information of the user to a server device associated with the telecommunication carrier, causing the server device to validate the personal information of the user.

3. The computer system of claim 2, wherein receiving, via the first user interface, the personal information of the user based at least in part on the user profile associated with the app further includes:

retrieving the user profile from a database connected to a computer platform associated with the app; and populating a first portion of the personal information of the user from the user profile, wherein the first portion of the personal information includes at least a name, a mailing address, a contact number, and payment information.

4. The computer system of claim 3, wherein receiving, via the first user interface, the personal information of the user based at least in part on the user profile associated with the app further includes:

receiving a second portion of the personal information of the user from user input on the first user interface, the second portion of the personal information including a social security number of the user; and sending the second portion of the personal information to the server device, causing the server device to validate the second portion of the personal information of the user.

5. The computer system of claim 2, wherein the operations further include:

providing a second user interface of the one or more user interfaces;

receiving, via the second user interface, the equipment identity of the mobile device; and sending the equipment identity of the mobile device to the server device, causing the server device to validate the eligibility of the mobile device for the eSIM based at least in part on the equipment identity.

6. The computer system of claim 5, wherein the operations further include:

in response to the personal information of the user and the eligibility of the mobile device for the eSIM being validated, causing the server device to:

create a subscriber profile with the telecommunication carrier for the user based at least in part on the user profile associated with the app.

7. The computer system of claim 6, wherein the service is provided to the user as a try product, and the operations further include:

generating a report including service usage and network experience in a try period; and recommending, based at least in part on the report, renewal of the service after the try period, wherein the renewal of the service indicates the subscription of the service is to be charged.

8. A computer-implemented method comprising:

providing information of a service on a graphical user interface of an app on a mobile device, the service being provided by a telecommunication carrier;

receiving a selection of the service from on the graphical user interface of the app;

in response to the selection, providing one or more user interfaces on the graphical user interface of the app enabling a subscription of the service for a user based at least in part on a user profile associated with the app;

receiving, via the one or more user interfaces, an equipment identity of the mobile device;

validating, based at least in part on the equipment identity of the mobile device, an eligibility of the mobile device for an embedded subscriber identity module (eSIM); and causing the subscription for the service to be activated based at least in part on the eligibility of the mobile device for the eSIM.

9. The computer-implemented method of claim 8, further comprising:

providing a first user interface of the one or more user interfaces;

receiving, via the first user interface, personal information of the user based at least in part on the user profile associated with the app; and sending the personal information of the user to a server device associated with the telecommunication carrier, causing the server device to validate the personal information of the user.

10. The computer-implemented method of claim 9, wherein receiving, via the first user interface, the personal information of the user based at least in part on the user profile associated with the app further comprises:

retrieving the user profile from a database connected to a computer platform associated with the app; and populating a first portion of the personal information of the user from the user profile, wherein the first portion of the personal information includes at least a name, a mailing address, a contact number, and payment information.

17

18

11. The computer-implemented method of claim 10, wherein receiving, via the first user interface, the personal information of the user based at least in part on the user profile associated with the app further comprises:

receiving a second portion of the personal information of the user from user input on the first user interface, the second portion of the personal information including a social security number of the user; and sending the second portion of the personal information to the server device, causing the server device to validate the second portion of the personal information of the user.

12. The computer-implemented method of claim 9, further comprising:

providing a second user interface of the one or more user interfaces;

receiving, via the second user interface, the equipment identity of the mobile device; and sending the equipment identity of the mobile device to the server device, causing the server device to validate the eligibility of the mobile device for the eSIM based at least in part on the equipment identity.

13. The computer-implemented method of claim 12, further comprising:

providing a third user interface of the one or more user interfaces;

receiving, via the third user interface, a subscription request of the service; and sending the subscription request to the server device, causing the server device, in response to the personal information of the user and the eligibility of the mobile device for the eSIM being validated, to:

create a subscriber profile with the telecommunication carrier for the user based at least in part on the user profile associated with the app, and install an eSIM profile on the mobile device.

14. The computer-implemented method of claim 13, wherein the service is provided to the user as a try product, and the computer-implemented method further comprises:

generating a report including service usage and network experience in a try period; and recommending, based at least in part on the report, the subscription of the service after the try period.

15. A computer-readable storage medium storing computer-readable instructions, that when executed by a processor, cause the processor to perform operations including:

providing information of a service on a graphical user interface of an app on a mobile device, the service being provided by a telecommunication carrier;

receiving a selection of the service from on the graphical user interface of the app; and in response to the selection, providing one or more user interfaces on the graphical user interface of the app enabling a subscription of the service for a user based at least in part on a user profile associated with the app;

receiving, via the one or more user interfaces, an equipment identity of the mobile device;

validating, based at least in part on the equipment identity of the mobile device, an eligibility of the mobile device for an embedded subscriber identity module (eSIM); and causing, based at least in part on the eligibility of the mobile device for the eSIM, at least one of the eSIM or an eSIM profile associated with the eSIM to be downloaded to, or installed on, the mobile device.

16. The computer-readable storage medium of claim 15, wherein the operations further include:

providing a first user interface of the one or more user interfaces;

receiving, via the first user interface, personal information of the user based at least in part on the user profile associated with the app; and sending the personal information of the user to a server device associated with the telecommunication carrier, causing the server device to validate the personal information of the user.

17. The computer-readable storage medium of claim 16, wherein receiving, via the first user interface, the personal information of the user based at least in part on the user profile associated with the app further includes:

retrieving the user profile from a database connected to a computer platform associated with the app; and populating a first portion of the personal information of the user from the user profile, wherein the first portion of the personal information includes at least a name, a mailing address, a contact number, and payment information.

18. The computer-readable storage medium of claim 17, wherein receiving, via the first user interface, the personal information of the user based at least in part on the user profile associated with the app further includes:

receiving a second portion of the personal information of the user from user input on the first user interface, the second portion of the personal information including a social security number of the user; and sending the second portion of the personal information to the server device, causing the server device to validate the second portion of the personal information of the user.

19. The computer-readable storage medium of claim 16, wherein the operations further include:

providing a second user interface of the one or more user interfaces;

receiving, via the second user interface, the equipment identity of the mobile device; and sending the equipment identity of the mobile device to the server device, causing the server device to validate the eligibility of the mobile device for the eSIM based at least in part on the equipment identity.

20. The computer-readable storage medium of claim 19, wherein the operations further include:

providing a third user interface of the one or more user interfaces;

receiving, via the third user interface, a subscription request of the service; and sending the subscription request to the server device, causing the server device, in response to the personal information of the user and the eligibility of the mobile device for the eSIM being validated, to:

create a subscriber profile with the telecommunication carrier for the user based at least in part on the user profile associated with the app.

\* \* \* \* \*